Figure 1:
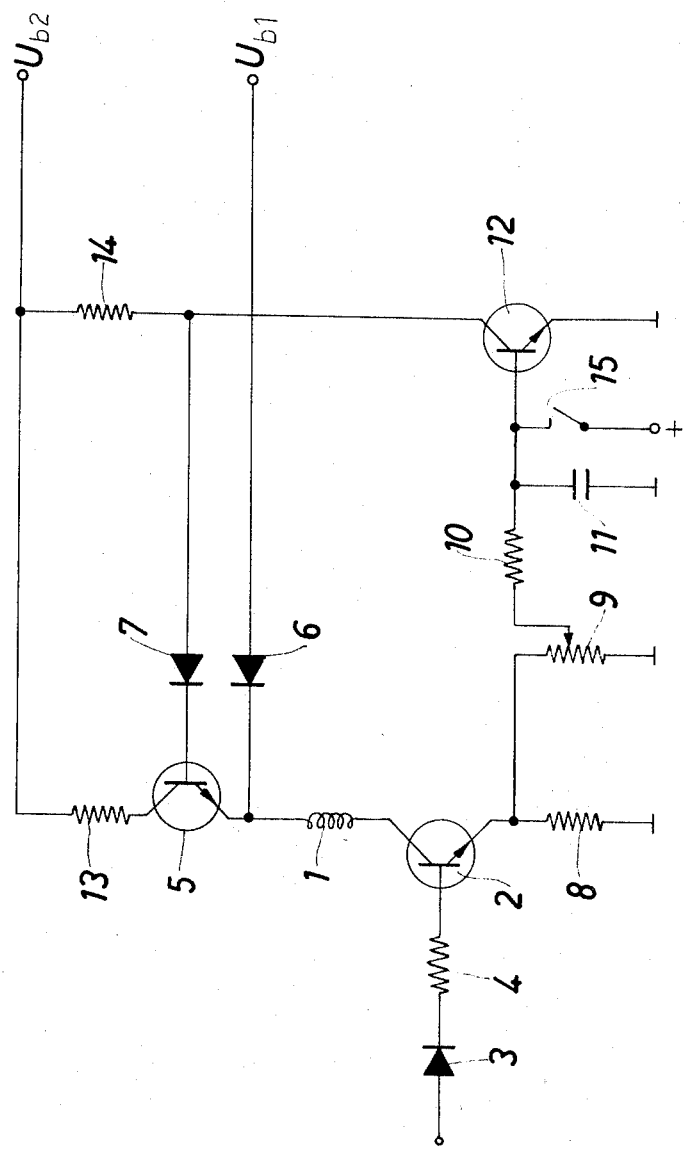

United States Patent [19]
Doring

[11] 3,789,237
[45] Jan. 29, 1974

[54] DEVICE FOR RAPID SWITCHING OF INDUCTORS

[75] Inventor: Gerhard Doring, Jena, Germany

[73] Assignee: Jenoptik Jena G.m.b.H., Jena, Gera, Germany

[22] Filed: Dec. 26, 1972

[21] Appl. No.: 318,066

[52] U.S. Cl. .............................................. 307/104
[51] Int. Cl. ........................................... H01f 27/42
[58] Field of Search........ 307/104, 4 B, 44, 51, 112, 307/149

[56] References Cited
UNITED STATES PATENTS
3,439,182 4/1969 Elsner................................ 307/104

Primary Examiner—Herman J. Hohauser

[57] ABSTRACT

In a device for rapid switching of inductors, particularly for use in electric stepping relay drive mechanisms, the upper limiting frequency is increased by a shortening of the starting time. Two voltage sources of different voltages are applied for feeding a short timed high voltage into the inductor via a switching means for the current to rise steeply. When the current has reached its rated value, a considerably lower voltage is fed into the inductor via said switching means.

5 Claims, 3 Drawing Figures

DEVICE FOR RAPID SWITCHING OF INDUCTORS

This invention is concerned with a device for rapid switching of inductors, particularly in stepping relay drive mechanisms.

In known electric stepping switches, the field coil of the stepping relay and a resistor in series therewith are connected to an operating-voltage source by means of a transistor, the rise time of the exciting current being proportional to the time constant $T = L/R$.

One such known switching device includes an RC network for rapid formation of the magnetic field of the inductor, the RC network and the inductor lying in series in the collector branch of the transistor. If in a switching device of this kind, the transistor is in conducting state, a considerable amount of current flows via the inductor to the condenser of the RC network, which thus produces a large magnetic field in the inductor within a comparatively short time. After the discharge of the condenser, only weak current flows through the resistor of the RC network and the inductor. However, this switching device also suffers from the disadvantage that the resistance of the RC network converts part of the employed power into heat.

The present invention aims at providing a device for rapid switching of inductors, particularly in electric stepping relay drive mechanisms, in which the upper limiting frequency is increased by a shortening of the starting time without appreciable dissipation of energy.

Thus, the present invention consists in a device for rapid switching of inductors, particularly in electric stepping relay drive mechanisms, in which an inductor and a resistor in series therewith are applied to a source of voltage by means of a transistor, wherein the inductor is in series with a second transistor and a switching means which applies comparatively high voltage for a short time to the inductor for the current to rise steeply, and applies comparatively low voltage to the inductor when the current has reached its rated value.

The switching means may be for example a current-controlled feedback circuit, a timing element, or a threshold-value switch of known construction.

The device according to the present invention, which operates with two sources of different voltages, the ratio being approximately 10 : 1, does not require the hitherto indispensible series resistance for the coil and offers as a further advantage a shortening of the rise time of the current, so that the upper limiting frequency can be increased accordingly.

When the higher voltage is disconnected and the device operates at comparatively low voltage, the resulting considerable prolongation of the rise time of the current permits a smooth of the stepping relay drive mechanism. The upper limiting frequency is accordingly lower, so that higher operating frequencies require reconnection of the second voltage source, which carries the higher voltage.

Figure 2:
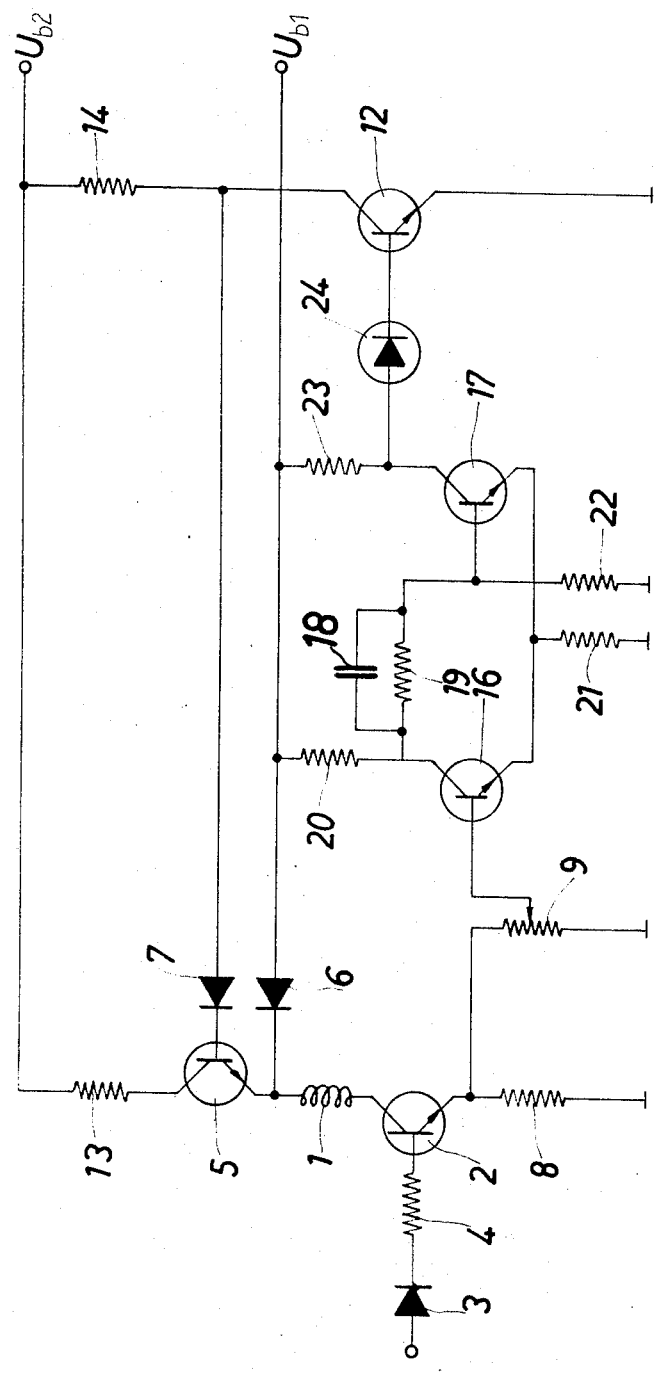
Figure 3:
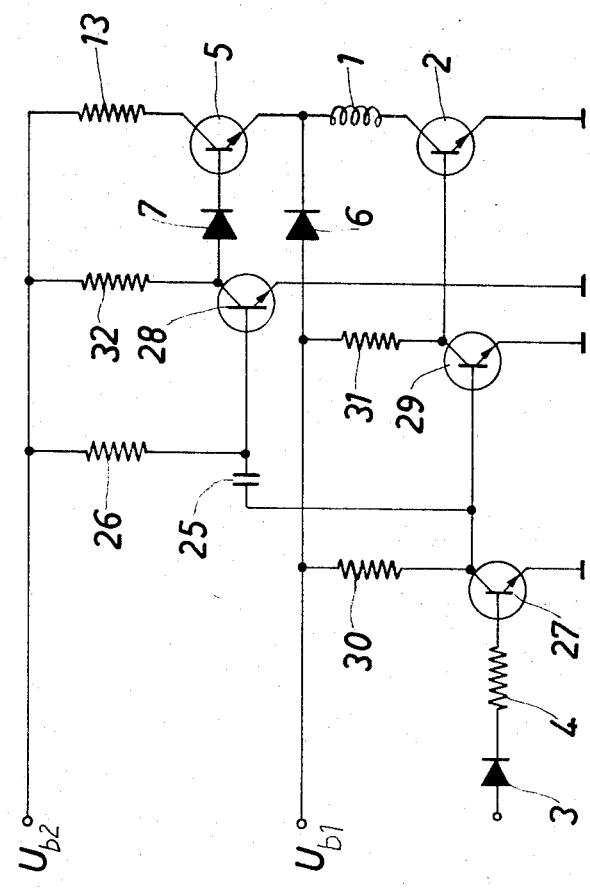

In order that the invention may be more readily understood, reference is made to the accompanying drawings which illustrate by way of example the circuit diagrams of three embodiments thereof, and in which FIG. 1 is a first embodiment, in which the changeover is effected by feedback circuit, FIG. 2 shows a second embodiment, which uses a Schmitt trigger circuit, and FIG. 3 shows a third embodiment, in which the changeover is effected by a timing element.

In the three figures of the drawings, like reference numerals designate like parts.

In FIG. 1, a transistor 2 is connected in series with an induction coil 1. A positive square-wave pulse supplied via a diode 3 and a resistor 4 renders the transistor 2 conductive. A transistor 5, likewise in series with the coil 1, is already conductive, so that a voltage source $U_{b2}$ transmits comparatively high voltage to the coil 1, while the considerable lower voltage of a source $U_{b1}$ is withheld from the coil 1 by a diode 6. The height of the voltage $U_{b2}$ causes a steep current rise in the coil 1. The voltage drop via an emitter resistor 8 of the transistor 2 is inversely proportional to the current rise. This temporary change in the voltage drop, which approximates an ascending straight line, is supplied to the base of a transistor 12 via a variable resistor 9 and an integrating element comprising a resistor 10 and a condenser 11. The transistor 12 is steeply controlled to the conducting state according to the magnitude of the current and the integration time constant, thus causing the transistor 5 to become nonconductive. Accordingly, the current flowing through the coil 1 is only due to the lower voltage $U_{b1}$. The trailing edge of the input pulse blocks the transistor 2. Owing to the decrease of the current flowing through the emitter resistor 8, the transistor 12 is blocked and the transistor 5 unblocked. A resistor 13 in the collector circuit of the transistor 5 as well as a collector resistor 14 of the transistor 12 offers comparatively weak resistance (approximately 0.5 to 1 ohm). The resistor 13 serves for providing a voltage drop, as required for completely gating the transistor 5 and is not accordingly considered as a series resistance to the coil 1 which causes appreciable loss.

It is possible to apply additional positive voltage to the base of the transistor 12 by means of a switch 15. In that case, the voltage source $U_{b2}$ does not influence the function of the inductor, so that the time constant of the coil 1 makes the stepping motor start smoothly.

In the embodiment shown in FIG. 2, the two voltage sources $U_{b2}$ and $U_{b1}$ are operated by a Schmitt trigger, and not by current-dependent feedback as in the embodiment according to FIG. 1. The Schmitt trigger comprises transistors 16 and 17, a condenser 18, and resistors 19, 20, 21, 22, 23. As in FIG. 1, the transistor 2 is opened by a positive input pulse. When the Schmitt trigger is at rest, also the transistor 5 is open, so that the higher voltage $U_{b2}$ is applied to the coil 1, and the voltage $U_{b1}$ is blocked by the diode 6. The steep current rise due to the voltage $U_{b2}$ causes the voltage in the emitter resistor 8 of the transistor 2 to drop more and more until the Schmitt trigger tilts over. Accordingly, the transmitter 12 becomes conductive, and the transistor 5 is blocked. The flow of current in the coil 1 is maintained by the lower voltage $U_{b1}$. The trailing edge of the input pulse again blocks the transistor 2. The resulting current drop in the emitter resistor 8 tilts the Schmitt trigger back, thus opening the transistor 5 for the next operation. The transistor 12 is thereby blocked completely by a Z diode 24.

Also in the embodiment shown in FIG. 2 it is possible to render the higher voltage $U_{b2}$ ineffective by applying additional voltage to the base of the transistor 12, so that the stepping motor makes a smooth start.

The embodiment shown in FIG. 3 differs from the embodiments in FIGS. 1 and 2 in that the change-over for the two operating-voltage sources in an RC network comprising a condenser 25 and a resistor 26. A transistor 27 and the transistor 2 are opened by a positive square-wave pulse, which is fed over the diode 3 and the resistor 4 to the base of the transistor 27. The square-wave pulse is at the same time impressed on the RC network so that a transistor 28 is blocked in consistency with the time constant of the RC network. Due to the saturation of the transistor 28 at rest, the time function of the voltage at the output thereof no longer corresponds to an $e$ function, but represents approximately a square-wave function the duration of which depends on the time constant of the differentiating network. Accordingly, the transistor 28 supplies voltage to the transistor 5 until the current due to the operating voltage $U_{b2}$ has reached its rated value. By the blocking of the voltage $U_{b2}$, the lower operating voltage $U_{b1}$ previously blocked by the diode 6, is applied to the coil 1. The trailing edge of the input blocks the transistor 2 over the transistor 27 and a transistor 29.

Also in the embodiment shown in FIG. 3, the higher operating voltage $U_{b2}$ can be rendered ineffective by supplying positive voltage to the base of the transistor 28, so that the time constant of the coil 1, which is considerable, makes the stepping motor start smoothly.

I claim:

1. A device for rapid switching of inductors, particularly in electric stepping relay drive mechanisms, comprising an inductor,
   a resistor in series connection with said inductor,
   two sources of different voltages,
   a first transistor being connected in series with said inductor and said voltage sources in order to apply in its conducting state a voltage to said inductor,
   a second transistor, and
   a switching means being connected in series with said inductor,
   said switching means being adapted to supply via said second transistor said inductor with a comparatively high and short timed voltage for producing a steep current rise therein,
   said voltage being provided by the one of said sources,
   and to further supply said inductor with a comparatively low voltage derived from the other of said sources when the current through said inductor has reached its rated value.

2. A device as claimed in claim 1, wherein said switching means is a current-dependent feedback circuit.

3. A device as claimed in claim 1, wherein said switching means is a timing element.

4. A device as claimed in claim 1, wherein said switching means is a threshold-value switch.

5. A device as claimed in claim 1, wherein the voltage ratio of said two sources is approximately 10 : 1.

* * * * *